March 4, 1947.   H. L. SHUGART   2,417,020
GRAIN UNLOADER
Filed Sept. 4, 1945   2 Sheets-Sheet 1

INVENTOR.
Hardie Lee Shugart
BY Loyal J. Miller
ATTORNEY

March 4, 1947.  H. L. SHUGART  2,417,020
GRAIN UNLOADER
Filed Sept. 4, 1945  2 Sheets-Sheet 2

INVENTOR.
Hardie Lee Shugart
BY Loyal J. Miller
ATTORNEY

Patented Mar. 4, 1947

2,417,020

UNITED STATES PATENT OFFICE 2,417,020

GRAIN UNLOADER

Hardie Lee Shugart, Oklahoma City, Okla., assignor of one-half to Ed. Reynolds, Oklahoma City, Okla.

Application September 4, 1945, Serial No. 614,387

6 Claims. (Cl. 214—83)

My invention relates to apparatus for handling grain, and more particularly to mechanism for moving grain from an automotive truck body to an elevated opening in a storage bin.

Most farm granaries or storage bins have their intake openings located a few feet above the platform level of the average truck, and therefore, a usual dump truck offers no help in filling the bins. The result is that the grain is usually shoveled in manually from the truck to the bins.

The prime object of the present invention is to provide grain handling apparatus which will move grain from a truck body into an elevated opening in the bin, and which is powered by the truck engine.

In carrying out the invention, a tubular body, which houses a spiral conveyor, is used for elevating the grain from the truck to the bin. Since most of the bin openings are above the tops of the usual granary doors, the conveyor is too tall to pass through the average doors.

It is therefore the object of the invention to provide as a part of the apparatus, an elevator which may be bodily removed from the vehicle without the use of any tools.

A further object is to provide a removable elevating apparatus which may be removed from or installed upon the apparatus by one person.

Another object is to provide a single apparatus for the purposes described, which may be installed upon standard trucking equipment with a minimum of labor and other expense.

Other objects will be apparent from the following description when taken in conjunction with the accompanying two sheets of drawings, wherein.

Like characters of reference designate like parts in all of the figures wherein they occur.

In the drawings.

Figure 1:
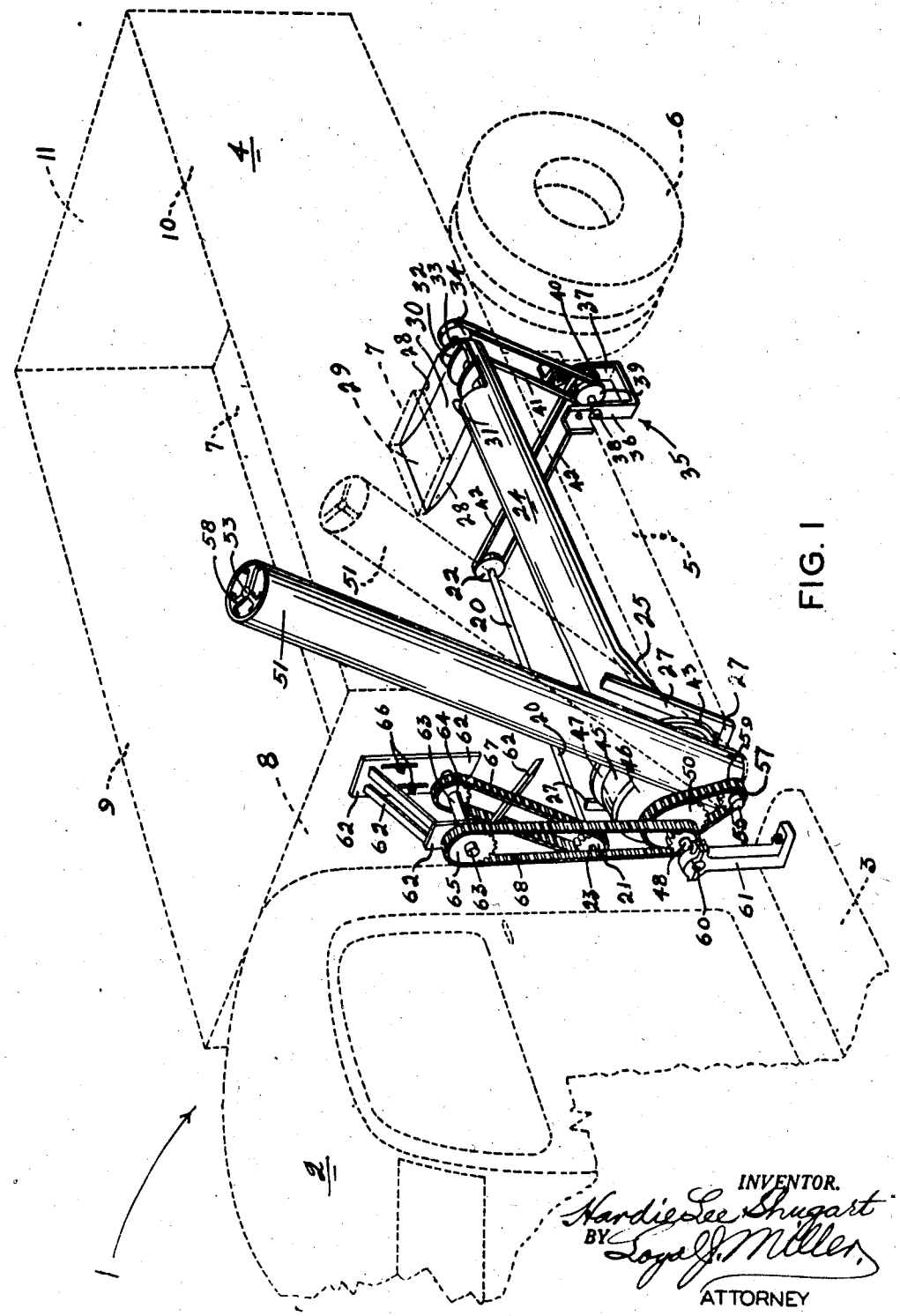
Figure 1 is a perspective view of the apparatus operatively installed upon the truck, the truck being shown in dotted lines.
Figure 2:
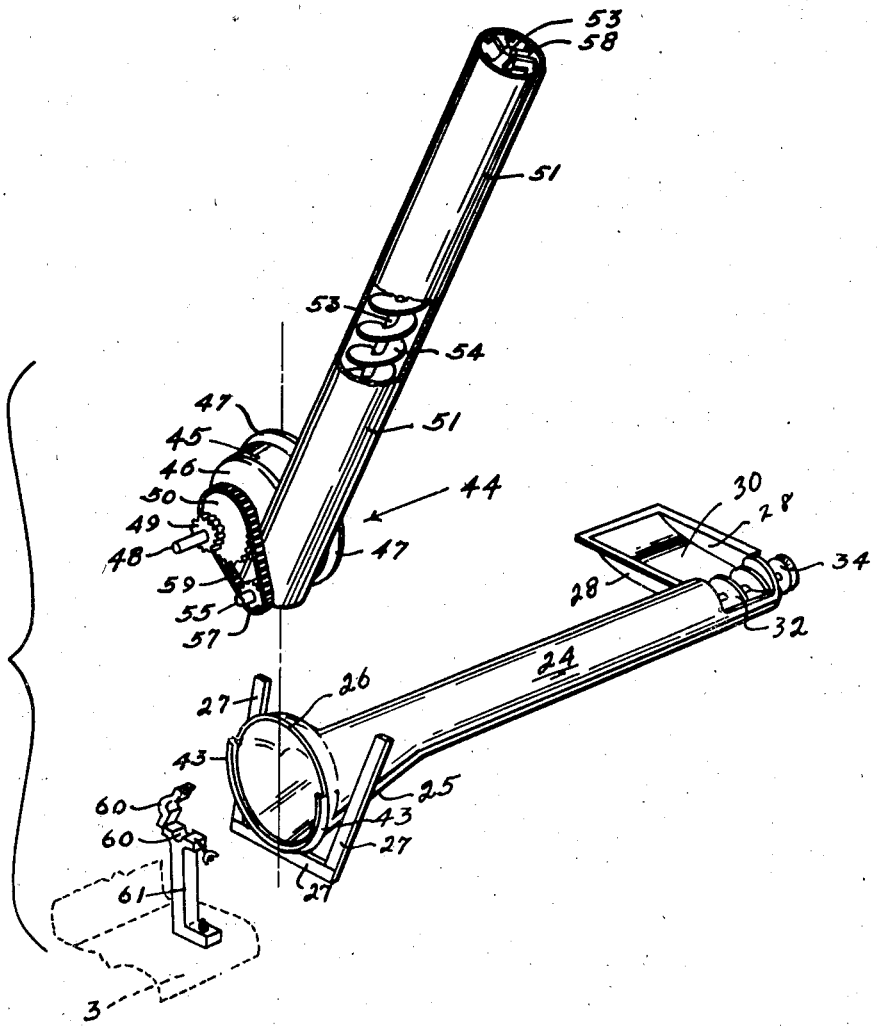
Figure 2 is a perspective view showing the elevating portion of the device raised a short distance above its supporting portion thereof; and, Figure 3 is a vertical sectional view through the lower end of the elevator and detailing its driving arrangement.

The reference numeral 1 indicates, as a whole, a typical automotive truck, including: a usual cab 2 having a horizontal step 3; a box-like body 4 supported upon a usual vehicle frame of which a horizontal beam 5 forms a part; and rear wheels 6 for rollably supporting the rear end of the beam 5. The body 4 has a flat bottom 7, a vertical front end wall 8, two parallel vertical side walls 9 and 10, and a rear wall 11.

The particular arrangement of the truck parts is not a portion of the present invention, but merely form the structure upon which the device, per se, is installed. Portions of the truck do not appear in the drawings, but the elements indicated by the reference numerals 1 and 11 inclusive constitute the truck portions with which the apparatus is closely associated.

The invention, per se, includes:

A horizontally disposed shaft 20 having a toothed gear 21 between the rear wall of the cab and the front end 8 thereof, and having a pulley 22 on its rear end. The shaft 20 is journalled for rotation in bearings, not shown, carried beneath the floor 7 of the body 4, and its extreme front end portion 23 extends beyond the gear 21 and is driven to rotation by a switchable power take off from the main drive shaft of the truck.

This main drive shaft and power take off are not shown in the drawings, but the shaft is usual to automotive trucks, and the power take off may be of any conventional type.

Extending along the outside surface of the body side 10 at a point slightly above the frame 5, there is provided a horizontal hollow tubular conveyor housing 24, having an enlarged portion 25 which tapers downwardly and terminates in an annular forwardly projecting flange 26.

The forwarding end of the housing 24 extends a short distance beyond the front end 8 of the truck body and is rigidly connected to the body by any suitable means, such as a bracket 27. The rear end of conveyor housing 24 is rigidly held at the side of the body 4 by two spaced arms 28 which extend through the side 10 and along the nether surface of the body floor 7. The floor 7 has a cut-out opening 29 between the arms 28, and the space between the arms is floored with sheet metal to form a chute 30 leading into an upper opening 31 in the conveyor housing 24.

Rotatably mounted in the housing 24 and extending for substantially the entire length thereof, is a usual spiral conveyor 32. The rear end of the shaft of the conveyor projects beyond the closed end 33 of the housing 24, and a pulley 34 is mounted rigidly upon this projecting end.

As a means for driving the pulley 34, the frame No. 5 is equipped with a rigid bracket 35 having two vertical parallel sides 36 and 37. A rotatable shaft 38 is journalled in the bracket sides, and two pulleys 39 and 40 are keyed to the shaft. The pulley 39 is in alignment with the pulley 34 and an endless belt 41 drivably connects the two pulleys. The pulley 40 is in alignment with the pulley 22 on the shaft 20, and an endless belt 42 surrounds the two pulleys to impart rotation to the shaft 38, when the shaft 20 is rotated by the vehicle motor as above described.

When the spiral conveyor is rotating, grain from the truck body 4 will travel by gravity along the chute 30 to the conveyor housing, and will be discharged by the conveyor at the enlarged forward end of the housing.

Surrounding approximately one hundred and eight degrees on the lower half of the flange 26 of the housing 24, is an inwardly projecting arcuate flange 43. The flange 43 is adapted to removably receive, and to retain in operative position, a grain elevator mechanism 44 for elevating grain from the front end of the housing 24 to a granary inlet opening.

The mechanism 44 includes:

A substantially dome-shaped drum 45 having a closed end 26, and having its other end open.

The open end is surrounded by an outwardly projecting annular flange 47 which is equal in outside diameter to the outside diameter of the flange 26 of the conveyor housing 24. The flange 47 is adapted to seat within the arcuate flange 43 and to register in flat end-to-end contact with the flange 26. The flange 43 acts to removably retain the drum 45 in position to completely close the forward end of the conveyor housing 24, and also acts to permit rotative action of the drum therein.

The closed end 46 of the drum 45 is perforated to receive a suitable bearing, not shown, which journals for rotation a horizontal shaft 48. Rigidly keyed to the shaft 48, is a small toothed gear 49 and a larger gear 50. Welded or otherwise rigidly connected to the end 46 of the drum 45 is the lower end of a hollow tubular conveyor housing 51 has a side opening 70 next to the drum, and the drum has a similar opening, not shown, to permit passage of grain from the drum to the housing 51. The drum 45 acts as a collector for receiving grain from the horizontal conveyor housing 24 and delivering it to the housing 51.

Figure 3:
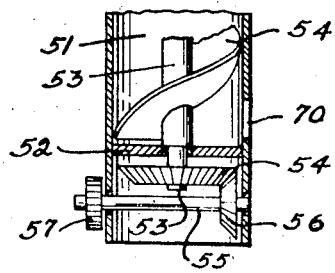

As best illustrated in Fig. 3, the lower end of the housing 51 has a transverse closure or partition 52 which journals the lower end of the axle shaft 53 of a usual spiral conveyor 54. The shaft 53 projects downwardly thru the partition 52 and to its lower end is keyed a miter-gear 54. Opposite sides of the lower end of the housing 51 are alignedly perforated to rotatably receive a horizontal shaft 55 which has one end projecting outwardly from the housing. The shaft 55, within the housing 51 is keyed to a second miter-gear which continuously meshes with the other miter-gear 54.

To the projecting end of the shaft 55 is rigidly keyed a tooth-gear 57, which forms a portion of a driving train for driving the conveyor 54 from the above described horizontal shaft 20.

The open upper end of the conveyor housing 51 is bridged by a suitable spider 58 which journals the upper end of the conveyor shaft 53. An endless chain 59 envelopes the gears 58 and 57. The projecting end of the horizontal shaft 48 of the drum 45 is rotatably supported by a usual bearing 60 which is carried by the upper end of a standard 61 supported by the step 3 of the truck.

As a means for driving the shaft 48, the front end 8 of the truck body 4 is equipped with a bearing bracket 62, which projects forwardly therefrom, and which journals for rotation the two ends of a horizontal jackshaft 63.

The shaft 63 has keyed thereto two gears 64 and 65, the gear 64 being aligned with the gear 21 on the drive shaft 20, and the gear 65 being aligned with the gear 49 on the horizontal drum shaft 48. The bracket 62 is vertically adjustable through action of set-nuts 66. An endless chain 67 envelopes the two gears 21 and 64, and a similar chain 68 offers driving connection between the two gears 65 and 49.

In operation, the truck motor is started and drives the shaft 20 to rotation. The grain in the body 4 passes through the chute 30 to the rear end of the conveyor housing 24, and is carried by the conveyor 32 to the collector 45. The shaft 20 also drives the conveyor 51 through action of the gears 21, 64, 65, 49, 50 and also 51, and also through action of the chains 67 and 68. The conveyor 54 lifts the grain from the collector 45 and discharges it at the open upper end of housing 51.

The housing 51 may, during operation, be tilted to any desired angle from the horizontal, since the flange 47 of the collector 45 is rotatable within the flange 43 of the conveyor housing 24.

The conveyor 51 is carried in a substantially vertical position during transportation. Its free end is therefore too high to enter many barn doors and granary doors, and most doors are too narrow to permit passage of the vehicle when the housing is disposed in a laterally tilted position, as illustrated in dotted lines in Fig. 1.

On the other hand, many other commodities besides grain are transported in the average farm truck, and consequently the elevator is not needed on the truck at all times.

When so desired, the conveyor housing 51 the conveyor 53, and the collector 45 with its accompanying shaft and gears, may all be removed as a unit without disturbing the chain 59. This is accomplished by merely raising the bearing cap of the bearing 60, and manually lifting the flange 47 out of the flange 43. The chain 68 is, of course, also removed.

It is thought that the above description and the accompanying drawing disclose a device capable of accomplishing all of the objects and purposes for which it is intended, and the operation thereof is clearly revealed.

Obviously some changes in the construction shown and described could be made without detrimentally affecting its practicability. I therefore do not wish to be confined only to the embodiment of the invention which is shown and described herein, further than I am limited by the scope of the appended claims.

I claim:

1. In apparatus of the class described, the combination with a motor driven vehicle having a body for carrying granular material, of: a spiral conveyor horizontally disposed along one side of said vehicle body; a chute leading to one end of the conveyor from the interior of the body; means associated with the motor of the vehicle for rotating the conveyor to move the material from the chute to the other end of the conveyor; a collector for receiving the material from the conveyor; a second spiral conveyor having its lower end communicating with the first conveyor for receiving the material therefrom; means for tiltably mounting the second conveyor; and driving connections from the motor to the second conveyor.

2. Mechanism as specified in claim 1, in which the tiltable conveyor mounting includes: an arcuate seat carried by the first conveyor; an annular flange carried by the second conveyor and partially rotatable in said seat, said seat extending for approximately one hundred eighty degrees of a circle, and having its upper portion open whereby the flange may be lifted bodily therefrom with the second conveyor.

3. In apparatus of the class described, the combination with a motor driven vehicle having a body for carrying granular material, of: a spiral conveyor horizontally disposed along one side of said body; a chute leading to one end of the conveyor from the interior of the body; means associated with the motor of the vehicle for rotating the conveyor to move the material from the chute to the other end of the conveyor; a collector for receiving the material from the conveyor; means for mounting the collector for partial rotation upon a horizontal axis; a second spiral conveyor having its lower end rigidly carried by the collector for receiving the material therefrom, said conveyor having an upper open end; and driving connections from the motor to the second conveyor, said collector mounting means including an annular flange on the collector; and an arcuate element on the first conveyor for seating the flange rotatably, the upper portion of said element being open so that the collector may be freely lifted therefrom.

4. As a sub-combination in apparatus of the class described, an adjustable pitch elevating conveyor and mounting therefor, including: a substantially cup-shaped material collector having an annular flange surrounding its rim; a tubular housing having one open end rigidly attached to the collector, said housing extending at right angles to the axis of said flange and communicating with the interior of the collector; a spiral conveyor rotatably mounted within the housing; and a rigid mounting means for rotatably enveloping the major portion of said flange.

5. Structure as specified in claim 4, in which said mounting means includes: an arcuately grooved element adapted to seat said flange and having its upper portion open so that the collector may be freely lifted therefrom.

6. Structure as specified in claim 4, in which said mounting means includes: a rigidly mounted arcuate seat extending for approximately one hundred eighty degrees of a circle, said seat being grooved to receive and rotatably support said collector flange, and having its upper portion open so that the collector and its flange may be freely lifted therefrom.

HARDIE LEE SHUGART.

REFERENCES CITED

The following references are of record in the file of this patent:

UNITED STATES PATENTS

| Number | Name | Date |
|---|---|---|
| 2,139,417 | Milan | Dec. 6, 1938 |
| 2,390,286 | Adams | Dec. 4, 1945 |
| 1,478,395 | Pierce | Dec. 25, 1923 |
| 2,381,780 | Simons | Aug. 7, 1945 |
| 2,319,588 | Dreese | May 18, 1943 |
| 1,956,789 | Bressler | May 1, 1934 |
| 2,239,256 | Siren | Apr. 22, 1941 |
| 2,022,166 | Welty | Nov. 26, 1935 |